United States Patent [15] 3,665,415
Beard et al. [45] May 23, 1972

[54] DATA PROCESSING SYSTEM WITH PROGRAM INTERRUPT PRIORITY APPARATUS UTILIZING WORKING STORE FOR MULTIPLEXING INTERRUPT REQUESTS

[72] Inventors: Albert L. Beard; John C. Hunter, both of Phoenix, Ariz.

[73] Assignee: Honeywell Information Systems, Inc.

[22] Filed: Apr. 29, 1970

[21] Appl. No.: 32,837

[52] U.S. Cl. ....................340/172.5
[51] Int. Cl. ....................G06f 9/18
[58] Field of Search ....................340/172.5

[56] References Cited

UNITED STATES PATENTS

| | | | |
|---|---|---|---|
| 3,331,055 | 7/1967 | Betz et al. | 340/172.5 |
| 3,297,994 | 1/1967 | Klein | 340/172.5 |
| 3,482,265 | 12/1969 | Cohen et al. | 340/172.5 |
| 3,483,522 | 12/1969 | Figueroa et al. | 340/172.5 |
| 3,534,339 | 10/1970 | Rosenblatt | 340/172.5 |
| 3,543,242 | 11/1970 | Adams, Jr. et al. | 340/172.5 |

*Primary Examiner*—Paul J. Henon
*Assistant Examiner*—Melvin B. Chapnick
*Attorney*—Edward W. Hughes, Fred Jacob and Edward A. Gerlaugh

[57] ABSTRACT

A data processing system having program interrupt apparatus with classes of interrupts for awarding priority to devices requesting service based in part on the relative priority of the device as a physical entity within the system and in part on the class or relative importance of the particular service requested by the device. Provision is made for storing a large number of interrupt requests in an interrupt multiplex table in working store. A representation of the relative importance of the service requested is supplied by the device in an interrupt level code and stored by enabling one of a plurality of bistables. Associated with each bistable is an area of system store in which a representation of the preassigned relative priority of the device is stored. In servicing interrupt requests a memory vector derived from the highest priority bistable and the highest representation stored in the corresponding area of system store is provided to the central processor.

6 Claims, 8 Drawing Figures

INVENTOR.
ALBERT L. BEARD
JOHN C. HUNTER

DATA PROCESSING SYSTEM WITH PROGRAM INTERRUPT PRIORITY APPARATUS UTILIZING WORKING STORE FOR MULTIPLEXING INTERRUPT REQUESTS

BACKGROUND OF THE INVENTION

The present invention relates generally to electronic data processing systems and more particularly to a data processing system which has greatly enhanced capabilities for performing an interruption to normal program execution; which interruptions are recognized on a relative priority basis.

1. Field of the Invention

In the data processing field it is customary and expedient to provide what is generally known as a program interruption scheme. Such schemes may be used, for example, in a data communications system having a data processor, a plurality of peripheral units, communicating devices, or other means which on occasion must have access to the memory (working store) or to the data processing unit for data computation. These interruption schemes follow many forms, all of which have essentially one thing in common. That common requirement is that the program then being executed by the processing unit or central processor of the system must be interrupted in order for the peripheral unit or communicating device to perform some function either with respect to the memory or the processing unit in order for that externally communicating device to continue with its existing operation. To this end, there is provided in all modern day electronic data processing systems a means by which the existing program may be interrupted to allow these functions with respect to the communicating device.

2. Description of the Prior Art

One known means of providing such interruption is to provide, someplace within the system, a plurality of bistable elements, normally that which is commonly referred to as a flip-flop, with each of these bistable elements being assigned or corresponding to a particular need to perform a program interruption. When a particular communicating device associated with the system requires some form of servicing from the central processor or memory it develops a signal which is recognized by the particular bistable element through a change in its state. At some time later, depending upon the priority scheme within the overall system, this bistable element will be recognized and the interruption initiated. In certain systems, the recognition of the particular bistable element effects the generation of a particular memory address which is used, in combination with the recognition of bistable element, to essentially halt the then being executed program and to effect an addressing of the memory location specified by the address. With the accessing of the memory, the contents of the location specified are brought from the memory to the processing unit and, utilizing normal program capabilities, the contents of that memory location will direct the future operation of the data processing system. This is commonly called a subroutine. One example of a typical subroutine, in response to an interruption such as is here being described, would be to store the interrupted program's instruction word in a particular memory location and to specify that location. The next instruction within the subroutine would normally be one which would direct the further operation of the subroutine to provide the required servicing of the communicating device. At the end of the subroutine would be found an instruction which would direct the processing system out of the then being executed subroutine back into the program which was interrupted at the same point where the interruption occurred.

The system described in the preceding paragraph serves quite satisfactorily in those circumstances where there are a relatively few number of communicating devices requesting a relatively few number of different types of interruptions. For example, in one known system, 16 bistable elements in the form of flip-flops are provided for this program interruption feature. However, as the size and complexity of systems becomes greater, and particularly in certain communications systems where large numbers of communicating devices are in communication with a single data processing unit and memory, the provision of an individual flip-flop to provide each of the required interrupt functions results in an inordinately high number of flip-flops which provides a very expensive structure. For example, a data communications system may employ a hundred or more individual communicating devices all cooperating in some respect with the central processor and memory, and each of these communicating devices may have several different types of interruptions which may be required at various times. It is readily apparent that to provide an appropriate number of individual bistable elements within the data processing system would result in a large and expensive piece of equipment and would require an extremely elaborate priority scheme to facilitate the recognition of all possible interruptions in a manner so as to not render any particular communicating device ineffective.

SUMMARY OF THE INVENTION

The present invention alleviates the problems of the prior art by providing a dual level system with relative priorities in each of the levels. It is further a feature of the present invention to provide that a portion of the working store or memory is utilized to store the actual interrupt requests. This is achieved, in the present invention by providing, in a manner similar to that known in the art, a number of bistable elements which can be the customary flip-flops within the system to register what may be termed as a first class of interrupt requests. Associated with each of these bistables is a location in memory, each bit position of that location being capable of storing one interrupt request. In the embodiment described, there are 16 such bistable elements with each of the memory locations associated therewith containing 16 effective bits for storage of interrupt requests to provide 256 individual interrupt capabilities. Each of the sixteen flip-flops is assigned a relative priority and each of the 16 effective bits within the associated memory locations is also assigned a relative priority such that in effect there is a relative priority within the working store from 1 to 256. When the processing unit, in the course of normal program execution, acknowledges the presence of one or more interrupt requests, a vector is provided in the form of a memory address. The vector is derived from the highest priority bistable element that is set and the highest priority enabled bit in the word from the memory location associated with that highest priority bistable. The address thus derived is a vector to memory for providing program deviation or interruption in a manner similar to that known in the art. If more than one of the bit positions was set, the word is restored with only the recognized bit reset and the bistable element associated with that remains set awaiting further recognition by the processing unit. In the event that no other bit within the word being accessed is registering the existence of an interruption request, then that word is restored in the unset state and the associated bistable element is reset indicating no more accesses are then necessary with that particular word.

It is, therefore, an object of the present invention to provide an improved electronic data processing system.

It is a further object to provide a data processing system having improved ability to effect deviations from existing program execution.

Another object is to provide a data processing system having greatly enhanced capabilities to register and recognize interruptions to existing program execution.

Still another object is to provide a data processing system having expanded program interruption capabilities including means to designate a relative priority with respect to the various interruption requirements.

A further object is to provide a data processing system having expanded capabilities for performing interruptions to existing program execution on a relative priority bases and in which vectors are generated to provide direction of the interruption.

BRIEF DESCRIPTION OF THE DRAWING

The foregoing and other objects and features of the invention will become more apparent and the invention itself will be best understood by referring to the following description and embodiments taken in conjunction with the accompanying drawings in which:

FIG. 2 is a composite drawing in four parts, FIGS. 2a, 2b, 2c, and 2d, which are described individually below and which, when arranged as shown in FIG. 3 illustrate in greater detail the data processing system of FIG. 1 and particularly the program interrupt feature of the system in which:

DESCRIPTION OF THE PREFERRED EMBODIMENT

Figure 1:
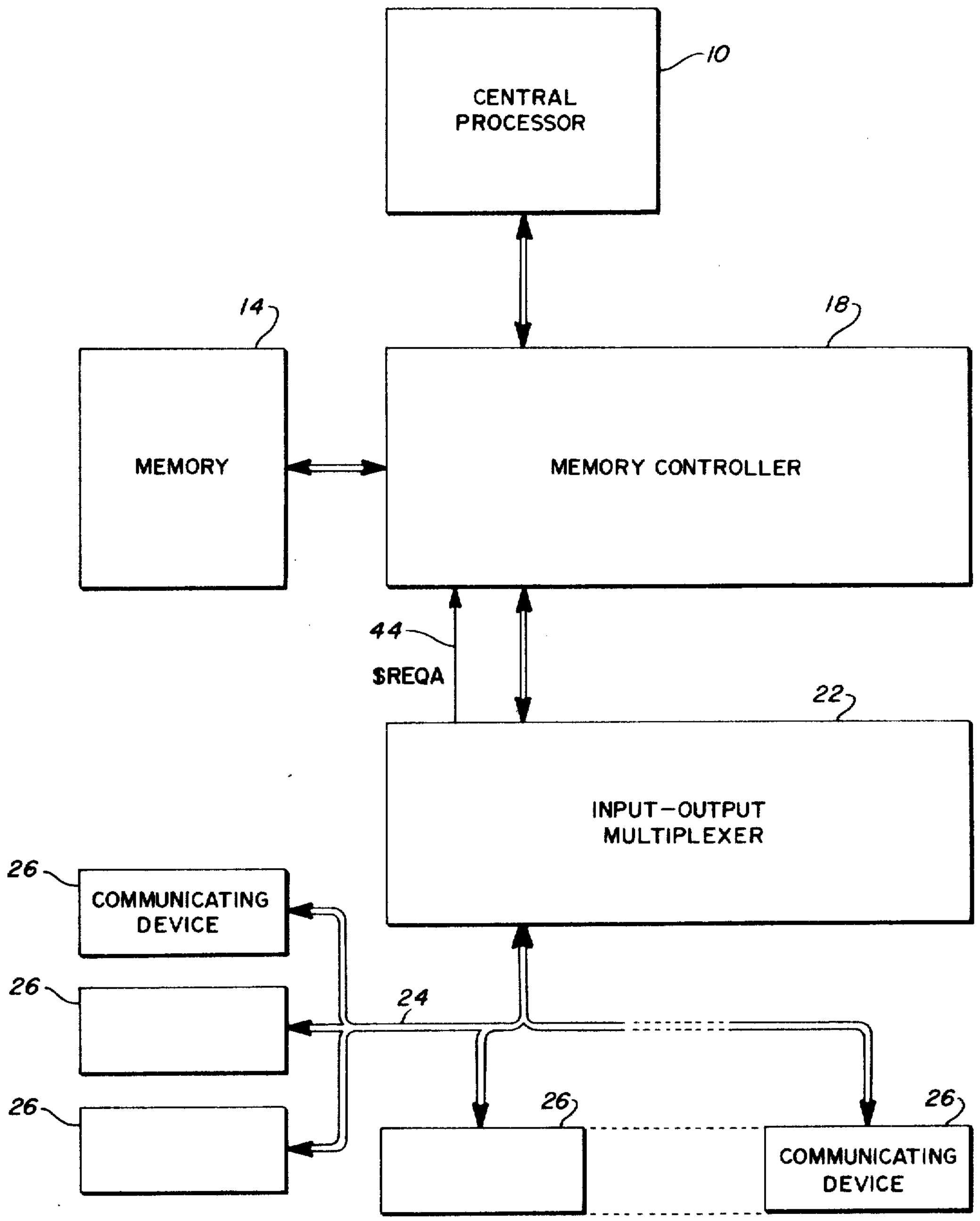
FIG. 1 is a simplified block diagram of a data processing system embodying the principles of the present invention.

Referring now to FIG. 1, a data processing system is shown which includes a central processor 10, a memory 14, a memory controller 18, an input/output multiplexer (IOM) 22, and a plurality of communicating devices 26. The central processor 10 responds to a plurality of distinct instructions which are supplied in a sequential order necessary to perform a particular data processing operation. The memory 14 may be any of the several well-known types which is capable of having the stored contents thereof selectively altered. In the embodiment presently being described, the memory 14 is a random access co-incident current type having discrete addressable locations each of which provides storage for a unit of data or a word. Words thus stored may, for example, be data words which are the result of processing, data words which are to be processed, instruction words, and auxiliary words which perform special control functions as will become more readily apparent as the description proceeds.

The input/output multiplexer (IOM) 22 provides for orderly sequencing of information transfers between the communicating devices 26 and the rest of the data processing system. The communicating devices 26 may be, for example, peripheral units such as punched-card readers and punches, magnetic tape handlers, magnetic disc storage units, or a system console which provides an indicating control station for an operator. The communicating devices may also be remote stations for supplying and receiving data. Such remote stations may include teletypewriter units or keyboard operated video display units operating in a time-sharing environment and remote data communications multiplexers to which there may be connected a plurality of communicating devices or peripheral units such as previously described. Another communicating device may consist of an inter-computer communicator for providing a data path between the data processing system of the instant invention and another data processing system. The IOM 22 controls the receipt of information from the communicating devices and coordinates the transfer of information to and from such devices as well as providing for the award of priority when more than one communicating device is attempting to communicate with the data processing system.

The central processor 10, memory 14, and IOM 22 are inter-connected by a memory controller 18 which coordinates communication among these system components and performs certain other tasks as will become more apparent as the description proceeds. The central processor 10 and the IOM 22, which are active units, process data at their independent rates, requesting communication with the memory 14, a passive unit, as the need arises. The only knowledge one active unit has of the other is that a memory communication request may be delayed while the memory 14 is responding to the other active unit through the memory controller 18. The memory controller thus controls the access to memory 14 and also provides communication control between central processor 10 and the IOM 22. The memory controller 18 acts as a data processing coordinating device for overseeing intrasystem communication as well as performing certain functions within itself.

The lines interconnecting the various components illustrated in the Figures represent paths of data and control communication. A double line configuration represents a parallel transfer path for multiple signals normally comprising a single data entity. For example, a data bus 24 couples the IOM 22 to each of the communicating devices 26. Individual signals are represented by single solid lines; for example, control line 44 which transmits signal $REQA (Request Pulse A).

Blocks of data are transferred between the memory 14 and a selected one of the plurality of communicating devices 26 independently of the central processor 10 but under control of an ordered process, the parameters of which were previously established by commands from the central processor 10 and stored in the memory 14. When such an ordered process is completed, or nears completion, the corresponding communicating device 26 must notify the central processor 10 that new parameters are to be established; that is, the communicating device requires program service.

For a more detailed description of the system and a complete understanding of the present invention, reference is now made to FIG. 2. As shown in FIG. 2, the need for program service is initiated by a representative communicating device 26 generating a signal, BCRS, which is transmitted by line 28 to a control and timing unit 30 in the IOM 22. The control and timing unit 30 which may be of a conventional type and serves to receive control signals from other units within the data processing system and to generate control signals that control the internal operations of the IOM 22 and in response to those internal operations generate other control signals which are transferred to the various components of the system.

When the IOM 22 is communicating with no other device, the control and timing unit 30 responds to the BCRS signal from the communicating device 26 with a signal, BCMD, which is transferred on line 32 to the communicating device 26. The BCMD signal serves to notify the communicating device that the lines of the data bus 24 are available and that the device is to respond by transferring a command word via the data bus 24 to a T register 34 in the IOM. The T register is a holding register which in this embodiment comprises eighteen bistable devices for holding information present on the lines of data bus 24. A pulse, $TRS, is generated concurrently with signal BCMD in the control and timing unit 30 and transferred by line 36 to the T register 34. The $TRS pulse serves to set or reset each of the T register bistables accordingly with the presence or absence of a signal on the corresponding line of the data bus 24. When a request for service is received from a communicating device the IOM examines the signals (a command or command word) from the device which are present on data bus 24 to determine the type of service required. The IOM executes a number of operations in response to commands from a communicating device; for example, data commands which provide data disposition directions to the IOM, and conditional interrupt commands. In addition to performing data transfers in response to the command word, the IOM records the need for an interruption of a program currently being processed in central processor 10 and gives notification of the event that a communicating device requires program service. Interrupts can occur unconditionally with no data transfer or conditionally as a result of data manipulation by the IOM. Interrupt conditions are requested as part of the command during the request for IOM service by the communicating device.

Figure 4:
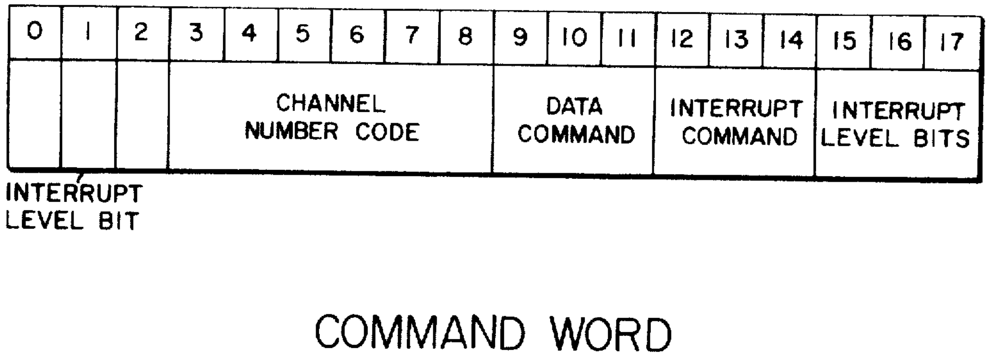
FIG. 4 illustrates a typical command word utilized in the system of the present invention.

The format of the command word is shown in FIG. 4. The command word, an 18 bit word, transfers information pertaining to both data operations to be performed as well as interrupt notification. As only the latter are pertinent to the present invention, those portions of the word relating to data operations will not be further discussed. A large number of communicating devices 26 may be connected to IOM 22. It is necessary to distinctly identify each device not only as a physical entity, but also with regard to its relative importance to the overall operation of the data processing system; that is, its relative priority among the plurality of communicating devices. Referring now to FIG. 4, a channel number is assigned to each communicating device. Bits 3 through 8 of the command word, the channel number code, form a binary representation of the channel number assigned to a particular communicating device. The channel numbers are selected and assigned in accordance with the relative priority of the particular communicating device as will be further explained in the ensuing discussion. A four-bit interrupt level code is represented by bits 1, 15, 16 and 17 of the command word. The interrupt level code is used to designate one of the plurality of interrupt levels, of which there are 16 in the present embodiment. The four least significant bits of the channel number code, bits 5 through 8, are used to select one of a plurality (16 in the present embodiment) of interrupt sublevels. The channel number code is, therefore, preselected to indicate in part the relative priority of the communicating device for which it is selected.

The program interrupt is the main method of establishing communication between a communicating device 26 and the central processor 10. The interrupt makes the central processor aware of some real time event, such as the completion of the reading of data from a punched card or the completion of the transmission of a block of data items to a second communicating device. The central processor is made aware of such occurrences so that appropriate action in the form of a program subroutine which provides service to the interrupting device 26 can be taken. The communicating device can cause an interrupt unconditionally when it so requests. An interrupt may also be caused by the communicating device as part of a data operation cycle if a particular data result occurs due to data manipulation by the IOM 22. These interrupts, either conditional or unconditional, are requested by the communicating device by encoding bits 12, 13 and 14 of the command word with an appropriate interrupt command. (For the purposes of this description it is not necessary to discuss the contents of the data command portion of the command word, bits 9 - 11, and the remaining unidentified bits. These portions of the word direct data manipulation within the IOM 22 and are not relevant to the description of the invention. It is also unnecessary to describe the functional origins of the various interrupt condition codes generated by the communicating device and transferred to the IOM as bits 12 through 14 of the command word as they do not form a part of the present invention.)

The result of any interrupt command, regardless of whether it is unconditional or conditional upon some data manipulation that occurs in the IOM will ultimately be the same; namely, a notification to the central processor 10 that a selected one of a plurality of communicating devices 26 requires program service. Referring again to FIG. 2, an interrupt cycle decoder 38 responds to the interrupt command (bits 12—14) retained in the T register 34 to produce one of six discrete signals indicative of a particular interrupt condition. This interrupt signal is transferred by line 40 to the control and timing unit 30 where it is encoded in a normal manner (by suitable standard encoding logic, not shown) to produce signals CMDA 0–3. The CMDA 0–3 signals are transferred by command bus 42 to a command and control logic unit 46 in the memory controller 18. Concurrently with the transfer of the CMDA 0–3 signals, the control and timing unit 30 generates pulse $REQA in response to the interrupt cycle decoder 38. The $REQA signal, which indicates a memory cycle request, is supplied to the command and control logic unit 46 (FIG. **2*b*) via line 44**.

The command and control logic unit 46 performs essentially the same functions for the memory controller 18 as does the control and timing unit 30 for the IOM 22. Signals generated by command and control logic unit 46 are used to control internal operations in the memory controller and to generate control signals in response to those internal operations for transfer to other units within the data processing system so as to maintain synchronization between the independently operating components of the system.

In response to the memory cycle request pulse $REQA from the IOM 22, the command and control logic unit 46 in the memory controller 18 decodes the command signals CMDA 0–3 on command lines 42 as a set interrupt cell command, SIC, as shown symbolically by block 43, labeled SIC DECODE. This command is one of several which may be decoded from the signals on the command bus 42. However, for the purposes of this explanation the SIC command is the only one that need be considered as the remaining commands pertain to data manipulation and relate to the interrupt structure only insofar as such data manipulations result in the need for an interrupt. The decoding of the SIC command within command and control logic unit 46 results in a generation of certain control signals as will be described hereinafter. The command and control logic unit 46 is also responsive to the memory request pulse $REQA to generate a $MAVA pulse which is transferred by line 48 to the control and timing unit 30 of the IOM. The $MAVA pulse indicates to the IOM 22 that the signals on command bus 42 may be disabled and data supplied to the memory controller 18.

Interrupt Level Decode

As previously explained, when a particular communicating device 26 becomes active as a result of signal BCMD from control and timing unit 30 of the IOM 22, that communicating device responds by transferring a command word via the lines of data bus 24 to the T register 34. The IOM decodes the command word and proceeds with the operation indicated therein in co-operation with other units in the data processing system. A transfer bus 50 (FIG. 2a) represents the outputs of the T register bistables to various units within the IOM 22. Bit 1 and bits 15 through 17 are transferred to an interrupt level encoder 52; bits 12 through 14 are transferred to the interrupt cycle decoder 38; and bits 5 through 8 are transferred to an interrupt bit encoder 54.

The interrupt level encoder 52 functions as a formating device, rearranging the four interrupt level bits of the command word into a four-bit interrupt level code having contiguous bits. The interrupt level code thus formed, signals DN 14–17, is transferred by a bus 56 to an N-switch 58. The N-switch 58 is a conventional logic element switching device which, under control of the control and timing unit 30, selects and enables data, address, interrupt levels, and other information to the memory controller. The information transferred to the memory controller through the N-switch depends on the type of cycle being performed and how far the cycle has progressed. The interrupt bit encoder 54 receives signals T5 through T8, a portion of the channel number code, and from this four-bit code generates a 16-bit code. The interrupt bit encoder output is comprised of 16 discrete signal lines, designated respectively DE 00–15, one of which is enabled or in the "1" state, the remaining 15 lines being disabled or in the "0" state. The enabled line is an indication of one of sixteen interrupt sub-levels corresponding to the particular need for program service.

As previously stated, the IOM requests a memory cycle by transferring the $REQA signal on line 44 to the command and control logic unit 46 of the memory controller 18. The command signals forming a part of the command word supplied by the communicating device 26 to the IOM 22 are translated in the interrupt cycle decoder 38 and transferred to the IOM as command signals CMDA 0–3 on bus 42. In response to these command signals, the command and control logic unit 46 of the memory controller transfers pulse $MAVA by line 48 to the control and timing unit 30 of the IOM to notify the IOM 22 that its request has been received and that the IOM can communicate with the memory. In response to the pulse $MAVA the control and timing unit 30 generates a signal CTTN which is sent, via line 60, to the N-switch 58. The CTTN signal serves to transfer the signals DN 14–17 from output of the interrupt level decoder 52 through the N-switch 58 and from there, via signal bus 62, to an address switch 64 in the memory controller 18. The address switch receives from various units within the data processing system signal groups which are each representative of a discrete memory address or location and, under control of the command and control logic unit 46, generates address signals for transmission to the memory 14. The address switch 64 also performs a switching function under control of command and control logic unit 46 whereby information which is transferred from IOM 22 on the lines of signal bus 62 is routed either to the memory 14 or to a data input switch 90. Signal bus 62, is time-shared by both address and data; thus, the address switch performs the function of differentiating between the address signals and data signals.

In response to the set interrupt cell (SIC) command which is decoded from signals on command bus 42 during an interrupt request cycle, the command and control logic unit 46 generates two signals, CESE and CSLA. These two signals are sent, respectively, by lines 68 and 70 to the address switch 64. The CSLA signal serves to gate the DN 14–17 signals from the interrupt level decoder 52 in the IOM 22, now present on the lines of signal bus 62, through the address switch 64 to an address register 16 of the memory 14 over an address bus 74. Signal CESE transfers the output of a sub-level base address generator 72 through the address switch to memory 14. The sub-level base address generator 72 generates a group of 14 fixed signals that are representative of a predetermined area 19 of a core unit 15 of the memory 14 which contains interrupt sub-level words.

The address signals transferred from the address switch 64 to the address register 16 in the memory 14, comprise two distinct parts of a complete address: a 14-bit portion (signals XA 00–13) supplied by the sub-level base address generator 72 and a four-bit portion (signals DS 14–17) which originated in the interrupt level decoder 52 of the IOM 22. The latter represents that portion of the command word from the communicating device 26 which is representative of an interrupt level code. The base address portion (from generator 72) points to the area 19 in the core unit 15 of the memory 14 reserved for interrupt sub-level words. The four-bit portion of the address is representative of one of sixteen interrupt levels peculiar to a communicating device or to one of a group of communicating devices desiring program service.

Figure 2A:
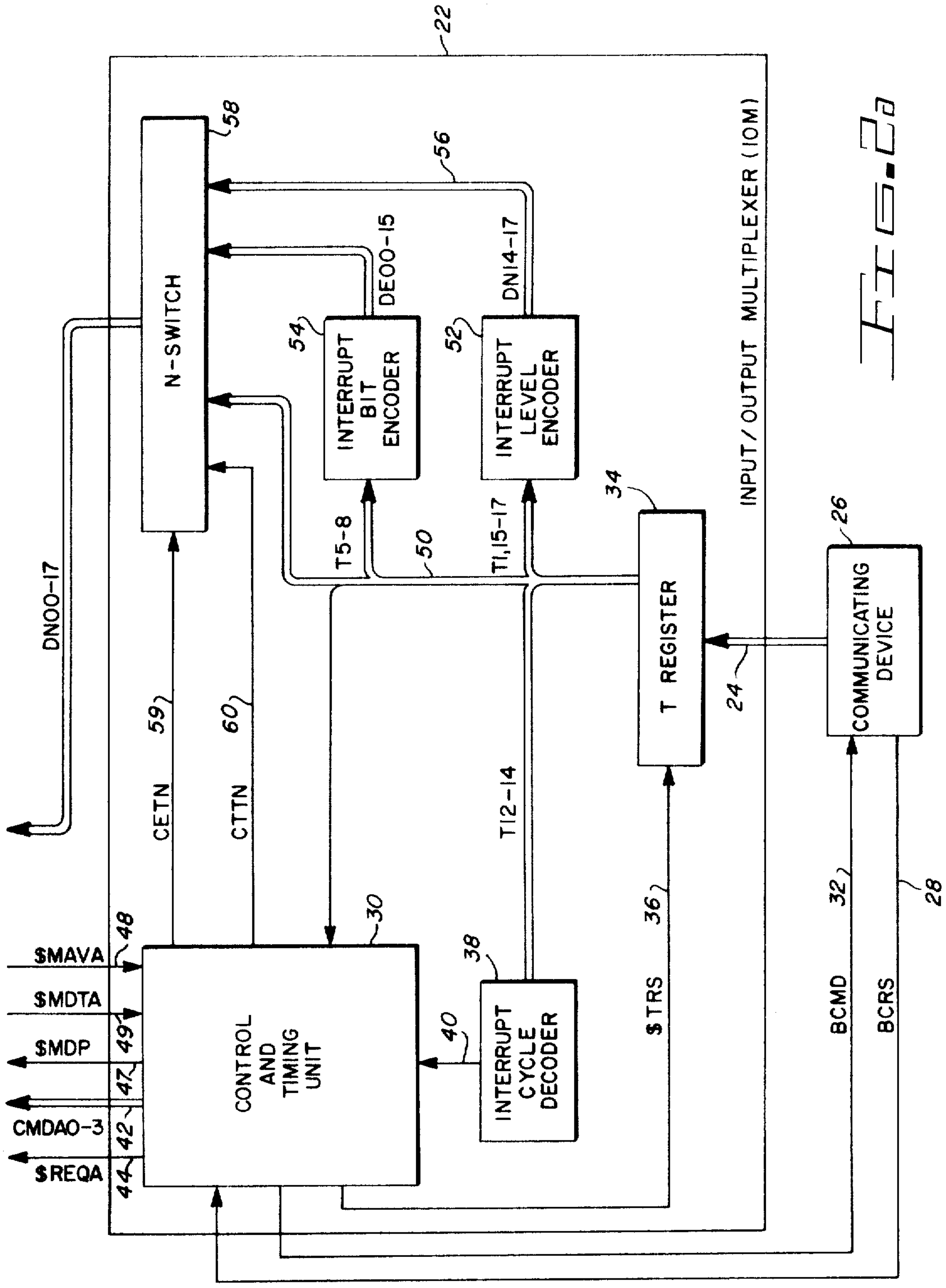
FIG. 2a is a block diagram of the Input-Output Multiplexer with a representative communicating device.
Figure 2B:
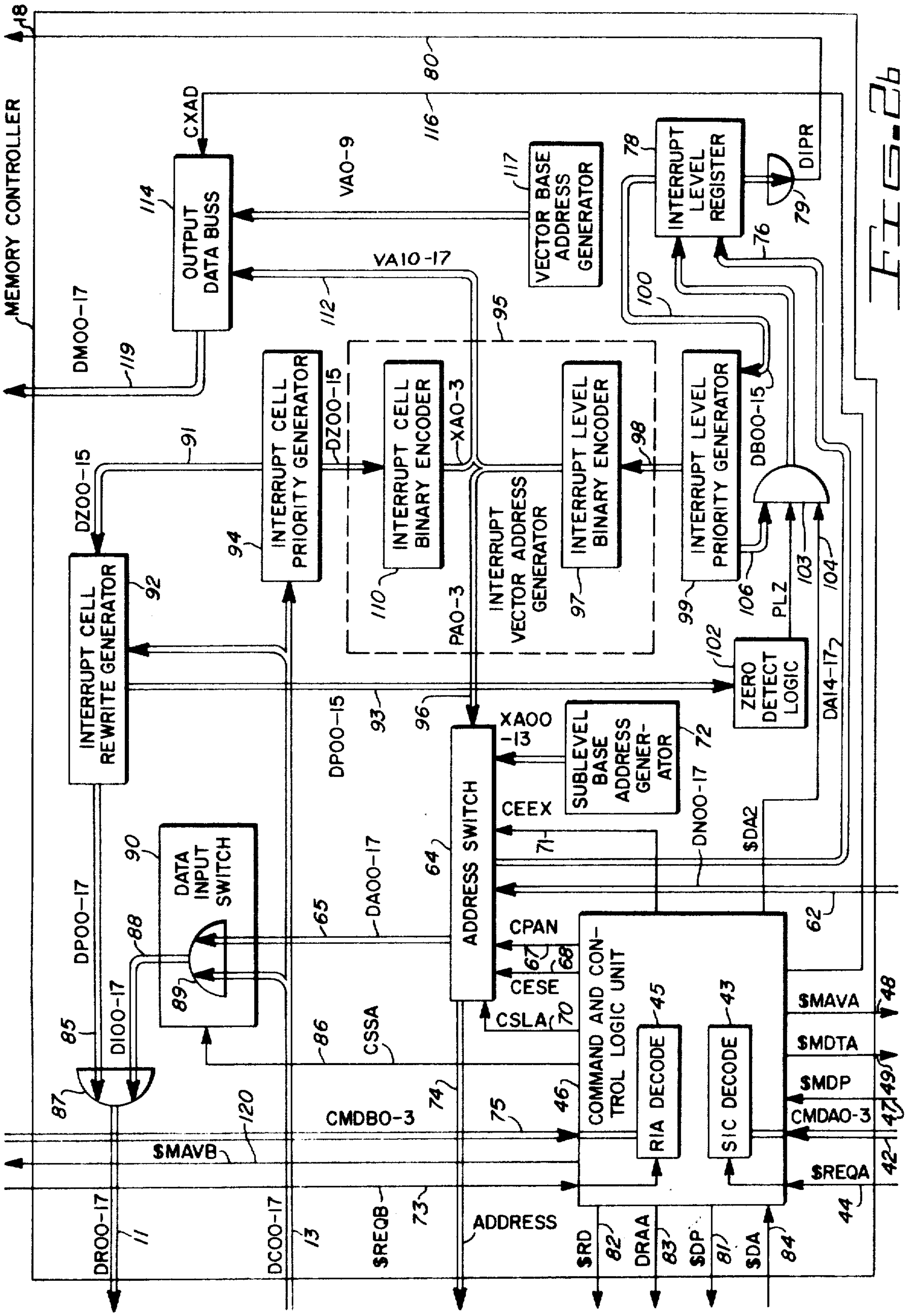
FIG. 2b is a detailed block diagram of the Memory Controller.
Figure 2C:
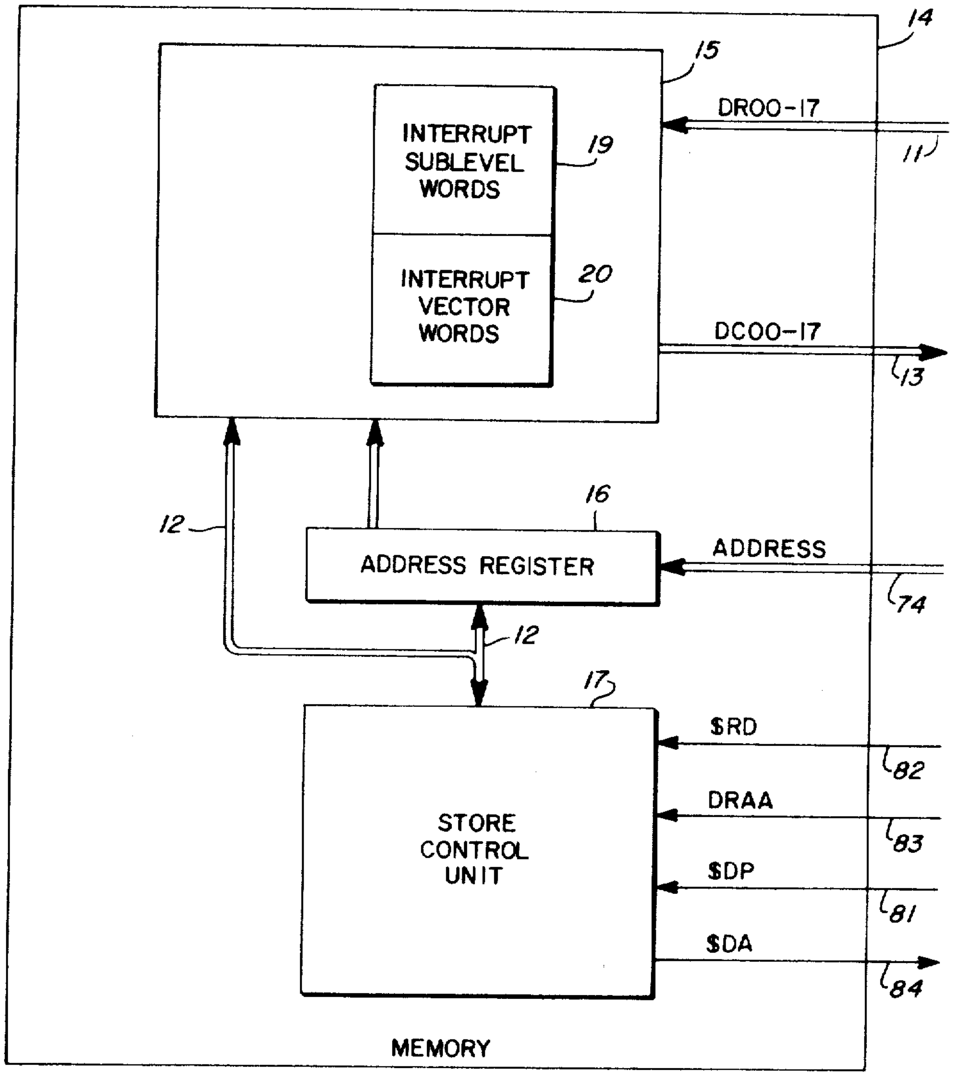
FIG. 2c is a block diagram of the Memory.
Figure 3:
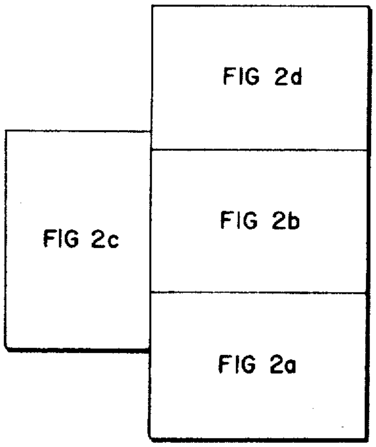

Referring now to FIG. 2c, the memory 14 as depicted in the present embodiment is a standard coincident current type core memory containing the core unit 15, the address register 16 and a store control unit 17. Two areas in the core unit 15, labeled respectively interrupt sub-level words 19 and interrupt vector words 20, represent predetermined fixed areas of contiguous storage locations reserved for the storage of special words used to control operations within the data processing system. The use of the interrupt sub-level words and the interrupt vector words will be explained in greater detail hereinafter.

Signal CSLA, derived from the command and control logic unit 46 (FIG. 2b), in addition to effecting the transfer of the address signals DA 14–17 from the address switch 64 to address register 16 in memory 14, also causes the transfer of signals DA 14–17 on bus 76 to an interrupt level register 78. The interrupt level register 78 is comprised of 16 bistables each of which corresponds to one of 16 interrupt sub-level words or storage locations in that area 19 of the core unit 15 reserved for interrupt sub-level words. In turn, each of the interrupt sub-level words contains sixteen binary storage cells or bits. The purpose of the set interrupt cell (SIC) operation in the data processing system is to set or enable one of the binary storage cells in a particular sub-level word. The corresponding bistable in the interrupt level register 78 is also set, when one or more of the cells in an interrupt sub-level word (stored in the core unit 15) are enabled. A selected one of the bistables in the interrupt level register 78 is enabled (set) in response to a SIC command as decoded by command and control logic unit 46 (block 43) resulting in address bits DA 14–17 being transferred to the interrupt level register 78 on lines 76. The four address signals thus transferred are decoded in the interrupt level register 78 by a standard binary decoder, forming a part of the register 78, to determine which level-register bistable (00 through 15) is to be set. If the selected bistable was already set by a previous set interrupt cell operation it will remain set.

The command and control logic unit 46, in response to the decoding of a SIC command, generates a pulse $RD, and a signal DRAA. Pulse $RD and signal DRAA are transferred respectively by lines 82 and 83 from command and control logic unit 46 to the store control unit 17 in memory 14 (FIG. 2c). $RD is a read pulse which initiates a read cycle in memory while signal DRAA, the read-alter signal, serves to notify the store control unit 17 that the word being read from memory, in this case an interrupt sub-level word, will be altered before it is restored. The store control unit 17 of memory 14 is responsive to pulse $RD and other signals from memory controller 18 to generate control signals in a manner normal for a coincident current memory and transfer such signals by control lines 12 to the address register 16 and core unit 15 to access words selected by address register 16 and transfer such words on bus 13 to memory controller 18. Similarly, signals representing words to be stored in memory or previously stored words that had been altered in the memory controller 18 are received by the core unit on bus 11 and stored in core unit 15 in response to signals generated by store control unit 17.

When an interrupt sub-level word has been placed on bus 13 as signals DC 00–17 in response to a memory cycle initiated by read pulse $RD, the store control unit 17 generates pulse $DA (data available pulse), which is sent by line 84 to the command and control logic unit 46 of the memory controller 18. In response to the pulse $DA, the command and control logic unit generates a pulse $MDTA which is transferred on line 49 to control and timing unit 30 of the IOM 22. The $MDTA pulse serves to notify the IOM that the address data previously sent from the IOM 22 to memory controller 18 was received and that the sub-level interrupt word has been made available by the memory 14 to the memory controller. A selected sub-level interrupt word obtained from memory is transferred on bus 13 as signals DC 00–17 to a data input switch 90, in the memory controller 18. The data input switch is comprised of conventional logic elements which receive and temporarily store inputs from various units within the data processing system and serve to switch or gate selected inputs under control of signals from command and control logic unit 46 onto lines which transfer the signals to the memory 14. Data input switch 90 generates output signals DI 00–17 which are transferred by bus 88 to an OR-gate 87. OR-gate 87 is representative of a plurality of OR logic elements, the outputs of which are signals DR 00–17, the memory input signals which are transferred by bus 11 to core unit 15 of memory 14.

As previously explained, the IOM 22 was notified that a sub-level interrupt word had been read from memory and transferred to data input switch 90 by the $MDTA pulse delivered by line 49 to the control and timing unit 30 in response to the data available pulse, $DA, from the store control unit 17. In response to the $MDTA pulse, the control and timing unit 30 generates a CETN signal which is transferred by line 59 to the N-switch 58. The N-switch responds to the CETN signal by gating the DE 00–15 signals from the interrupt bit encoder 54 via bus 62 to the address switch 64 in the memory controller. Signals DE 00–15 from the interrupt bit encoder 54 are representative of the four least significant bits of the channel number code (part of the command word) which was received from the communicating device 26. The four-bit portion of the channel number code, which defines an interrupt sub-level and is represented by the signals T5–8, passes through an encoding network in the interrupt bit encoder 54 to generate a signal indicative of one of the sixteen sub-levels. For example, if an active communicating device 26 were to be assigned channel number 07 octal, the output signal DE 07, of the interrupt bit encoder 54 would be a logical one "1"; the other fifteen signals would be logical zero "0". The control and timing unit 30 allows sufficient time for signals DN 00–15 (signals DN 16 and 17 of the 18-bit transaction are not used in this instance) to stabilize on the signal bus 62 after which time the $MDP pulse is generated and transferred by line 47 to the command and control logic unit 46 of memory controller 18. This pulse ($MDP) informs the memory controller 18 that data is on the lines of signal bus 62.

In response to the $MDP pulse the command and control logic unit 46 generates signals CPAN and CSSA. Signal CPAN is transferred by line 67 to the address switch 64 which, in cooperation with signal CSLA previously enabled, effects the transfer of DN 00–17 signals through the address switch 64 onto lines 65 as signals DA 00–17. It should be remembered that a selected one of the sixteen DN 00–15 signals is enabled (in the logical "1" state) to designate one of the sixteen interrupt sub-levels as determined by bits 5 through 8 of the channel number code in the command word from the communicating device 26. Again, the high order signals DA 16 and 17 are not used as they have no significance to the set interrupt cell operation. Signals DA 00–17 are transferred to the data input switch 90 where they are applied to an OR-gate 89. OR-gate 89 symbolically represents a plurality of OR-logic elements which serve to "OR" the DA 00–17 and the DC 00–17 signals which are present on lines 13 and produce output signals DI 00–17. Thus, signals DC 00– 15, representative of the 16 active bits in the sub-level word obtained from core unit 15, and signals DA 00–15, representative of the output of the interrupt bit decoder 54 in the IOM 22, are combined in the data input switch 90. The command and control logic unit 46 is also responsive to the $MDP pulse to generate signal CSSA which is transferred on the line 86 to the input data switch 90. This signal effects the transfer of signals DA 00–17 from address switch 64 through input data switch 90.

The command and control logic unit 46 is also responsive to the $MDP pulse to produce a delayed pulse $DP. The delay, which is generated internally within the command and control logic unit 46, is to allow sufficient time for the several signals to be propagated through the address switch 64 and the data input switch 90. Pulse $DP is transferred from the command and control logic unit 46 to the store control unit 17 (FIG. 2c) by line 81. The store control unit 17 is responsive to pulse $DP to effect the writing of the new interrupt sub-level word, containing a new interrupt signal (along with any previously generated but unacknowledged interrupt signals) into the core unit 15. The $MDP pulse also causes the command and control logic unit 46 to generate a second $MDTA pulse which is also transferred by line 49 to the control and timing unit 30 of the IOM 22. The second $MDTA pulse acknowledges that the memory controller 18 has received the interrupt sub-level information generated in the interrupt bit encoder 54. In response to the second $MDTA pulse, the control and timing unit 30 of the IOM initiates a cycle shut-down which culminates in the release of communicating device 26, effected by disabling signal BCMD, along with all other control signals generated during the set interrupt cell (SIC) operation.

In brief summary of the set interrupt cell operation, upon receiving a command word from the communicating device 26 and decoding an SIC command from the interrupt command signals contained therein, a selected one of 16 bistables comprising the interrupt level register 78 of memory controller 18 is set. The bistable is selected by decoding signals representing the interrupt level code contained in the command word which originated in the communicating device. The interrupt sub-level word in core unit 15 of memory 14 which corresponds to the selected interrupt level bistable is read from memory and transferred to memory controller 18 where the information contained in the interrupt sub-level word is ORed with a new signal which is representative of a portion of the channel number code contained in the command word. The memory controller 18 thus has received and recorded in memory a notification from the communicating device 26 that program service is desired.

Figure 2D:
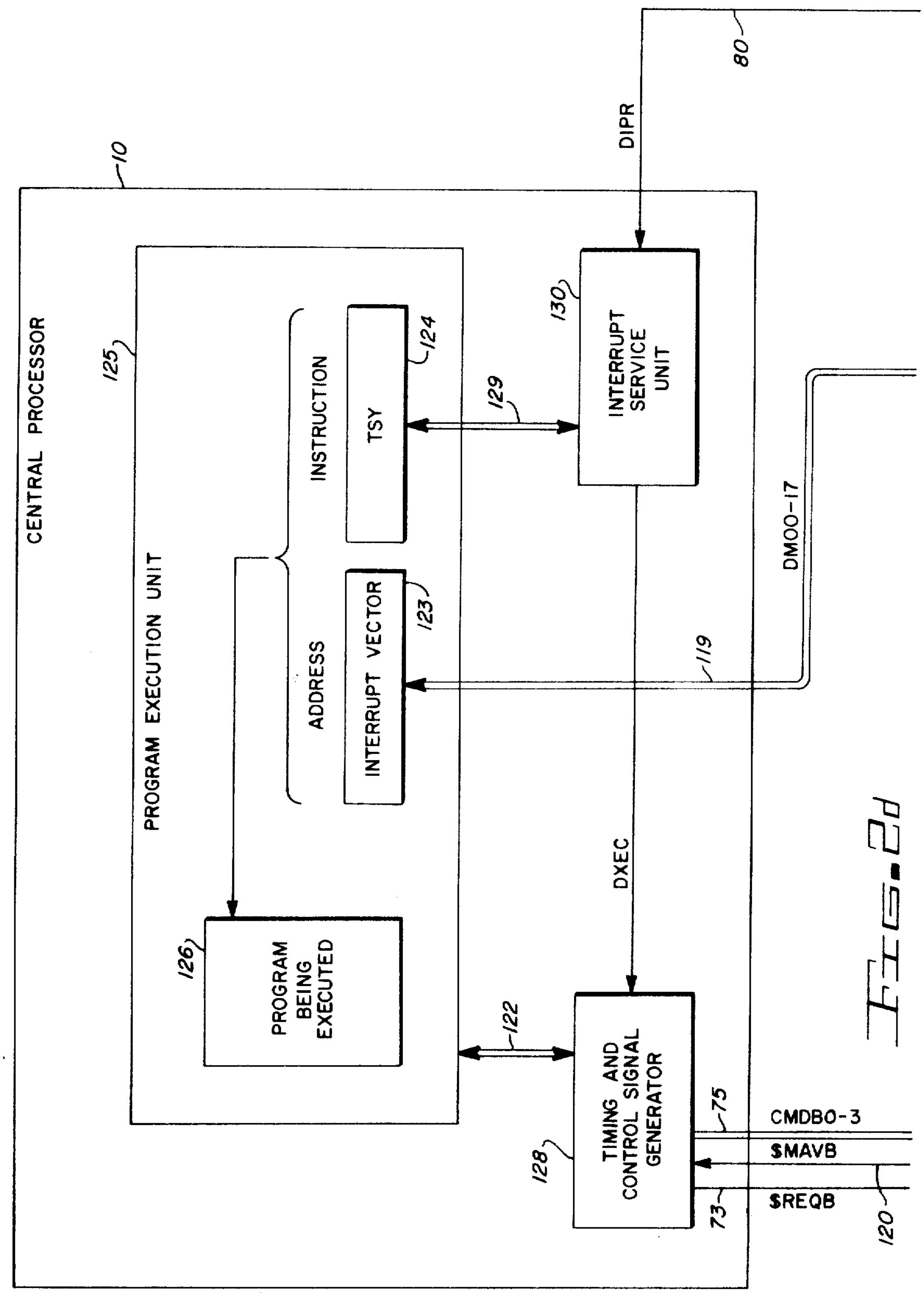
FIG. 2d is a block diagram of the Central Processor.

In the memory controller 18 (FIG. 2b) the output signals of the bistables comprising the interrupt level register 78 are connected to an OR-gate 79. When any one or more of the bistables is set to the "1" state an output signal DIPR is generated by the OR-gate 79 and transferred on line 80 to an interrupt service unit 130 of the central processor 10, (FIG. 2d). The DIPR signal serves to notify the central processor that a communicating device requires program service.

Interrupt Service

At such time during normal execution of program instructions by the central processor that the presence of an interrupt signal from a communicating device as represented by signal DIPR can be recognized, an execute signal DXEC is transferred from the interrupt service unit 130 to a timing and control signal generator 128. The timing and control signal generator 128 responds to the DXEC signal with a pulse, $REQB via line 73 to the command control logic unit 46 of memory controller 18. The $REQB pulse serves to notify the memory controller that memory service is desired by the central processor 10. Concurrently with the $REQB pulse, a four-bit binary coded command representative of the type of service desired by the central processor 10 is transferred by signal bus 75 to the command and control logic unit 46 as signals CMDB 0–3. Many different types of memory cycle commands well known in the art may be generated by the central processor. Among these are read-restore, read-alter-rewrite, clear-write, etc. When the command is generated in response to the interrupt present signal DIPR, the CMDB 0–3 signals are decoded in the command and control logic unit 46 as a read-interrupt address command (RIA) as illustrated symbolically by a block 45 labeled RIA DECODE.

Before proceeding with a description of the read-interrupt address command, it will be helpful to summarize and review the function of the interrupt sub-level word as it relates to the program interrupt apparatus. Within the memory unit 15 (see FIG. 2c) an area or block of contiguous storage locations 19 is reserved for interrupt sub-level words. Each of 16 of the 18 binary storage cells within a sublevel word is capable of storing either of the two values of one binary digit which represents the presence or absence of a program interrupt signal transferred to the memory by a specific communicating device. At any given instant, when the central processor acknowledges the interrupt present signal DIPR, there may be only one, or there may be a plurality of binary storage cells in the interrupt sub-level word block 19 enabled, i.e., in the "1" state. Since the interrupt signals are stored in an ordered manner according to the relative priorities previously assigned to each communicating device in the form of a channel number, it is necessary to determine which is the highest priority storage cell enabled in the interrupt sub-level word block 19. Instead of scanning each of the plurality of sub-level interrupt words in the memory block 19 to find the highest priority storage cell enabled, it is necessary only to determine which of the enabled bistables in the interrupt level register 78 (FIG. 2b) of the memory controller 18 has the highest relative priority, extract from memory the sub-level interrupt word which corresponds to that bistable, and then scan only that interrupt sub-level word to find the highest priority enabled storage cell. The interrupt level register 78, therefore, provides a direct indication of any or all sub-level words in which storage cells are set.

Referring now to FIG. 2b, output signals DB 00—15 from the interrupt level register 78 are each representative of the state of one of the bistables in the interrupt level register 78. The DB 00—15 signals are transferred by bus 100 to an interrupt level priority generator 99. The interrupt sub-level word corresponding to the highest priority enabled interrupt register bistable must be answered first. The interrupt level priority generator 99 serves to determine which of the enabled interrupt level bistables has the highest priority. The interrupt level priority generator 99 is a conventional priority network which generates a selected one of a plurality of signals (in this embodiment 16) which is representative of the highest priority enabled bistable in the interrupt level register 78.

Output signals IP 00—15 from the interrupt level priority generator 99 are transferred by bus 98 to an interrupt level binary encoder 97. The interrupt level binary encoder 97 is responsive to the IP 00—15 signals generated by the priority generator 99 to produce a four-bit partial address represented by signals PA 0—3 which comprise the low-order address bits of the sub-level interrupt word in memory area 19 (FIG. 2*c*) corresponding to the highest priority enabled interrupt level bistable. The PA 0–3 signals are transferred by bus 96 to the address switch 64.

As previously stated, when the central processor interrupt service unit 130 responds to the interrupt present signal DIPR by allowing the generation and transfer of pulse $REQB and command signals CMDB 0–3 to the command and control logic unit 46 of the memory controller 18, synchronizing read interrupt address (RIA) command is decoded as indicated symbolically by block 45, labeled RIA DECODE. The decode of an RIA command causes the generation of signals within the command and control logic unit 46 that serve to control the timing and switching functions pertaining to the RIA command within the memory controller 18. The RIA decode 45 also causes the generation of control pulses and signals for synchronizing the operation of the various units of the data processing system involved with the read interrupt address operation. The command and control logic unit 46 is responsive first to the RIA decode 45 to generate signals CEEX and CESE both of which are transferred, respectively, on lines 71 and 68 to address switch 64. The CESE signal serves to enable output signals XA 00–13 from the sub-level base address generator 72 through the address switch 64. Signal CEEX effects the transfer of partial address signals PA 0–3 through the address switch 64. The complete 18 bit address comprised of signals XA 00–13 and PA 0–3 is transferred on bus 74 to the address register 16 in memory 14 (FIG. 2*c*). The address signals thus transferred select one of a plurality of interrupt sub-level words in memory area 19 of core unit 15. In response to the RIA decode, the command and control logic unit 46 also generates pulse $RD and signal DRAA which are transferred respectively by lines 82 and 83 to store control unit 17 (FIG. 2*c*) of memory 14. The read pulse, $RD, serves to initiate a conventional read cycle in memory 14; signal DRAA, the read alter signal serves to notify the store control unit 17 that the word being read from core unit 15 will be altered prior to its restoration. When the interrupt sub-level word selected in response to the address signals contained in address register 16 is placed on the data bus 13 as signals DC 00–17 by control signals from the store control unit 17, the store control unit 17 generates pulse $DA, the data available pulse, and transfers it on line 84 to command and control logic unit 46 of the memory controller 18. The memory controller is thus notified that signals DC 00–17 representative of a selected interrupt sub-level word have been transferred to an interrupt cell rewrite generator 92 and an interrupt cell priority generator 94. The interrupt cell priority generator 94 contains a conventional priority network and serves to determine which bit of the 16 active bits of the selected interrupt sub-level word has the highest priority. The interrupt cell priority generator 94 yields 16 output signals, DZ 00–15, all of which are at a logical "0" level except the signal representing the highest priority bit. The DZ signal representing the highest priority bit will be a logical "1". Signals DZ 00–15 are transferred by bus 91 to the interrupt cell rewrite generator 92. The interrupt cell rewrite generator receives signals DC 00–17 on lines 13, these signals being representative of the interrupt sub-level word read from memory. The interrupt cell rewrite generator produces a word identical to the interrupt sub-level word, but with the highest priority bit stripped away or reset. The interrupt cell rewrite generator 92 logically compares the signals representative of the original word from the core unit with the signals DZ 00–15 from the interrupt cell priority generator 94. When a logical comparison is made, that bit is dropped from the data word written back into the core unit. DP 00–17 output signals from the interrupt cell rewrite generator 92 are transferred by lines 85 to OR logic element 87 from which the DP signals emanate as signals DR 00–17. Output signals DP 00–17 from interrupt cell rewrite generator 92 are also transferred by lines 93 to a zero detect logic unit 102. The zero detect logic unit generates a signal PLZ when the DP 00–17 signals from the interrupt cell rewrite generator 92 are all logical zeros, indicating that all the cells in the selected interrupt sub-level word have been reset by the priority interrupt servicing process. The command and control logic unit 46 is responsive to the data available pulse $DA to generate a delayed data available pulse $DA2. The purpose for the delay is to allow time for the signals representative of the interrupt sub-level word to be propagated through the interrupt cell priority generator 94, the interrupt cell rewrite generator 92 and the zero detect logic unit 102. The delayed data available pulse $DA2 is transferred by line 104 to an AND gate 103. AND gate 103 is representative of a plurality of AND logic elements each of which is a reset input to a corresponding one of the interrupt level register bistables. Other inputs to the AND gate 103 are signal PLZ from the zero detect logic unit 102 and the output signals of the interrupt level priority generator 99 which are transferred to AND gate 103 on lines 106. Only one of the plurality of signal lines 106 from the interrupt level priority generator 99 will be enabled or a logical "1," the enabled line being representative of the highest priority enabled bistable in interrupt level register 78. Thus, when the zero detect logic unit 102 yields signal PLZ, the output signal of AND gate 103 is enabled to effect the reset of the bistable in interrupt level register 78 which corresponds to the sub-level interrupt word for which priority service has been completed.

Interrupt Vector Address

The program interrupt scheme of the present invention includes a plurality (in this embodiment, 256) of interrupt cells arranged in 16 levels of priority. Signals representing requests for program interruption from communicating devices are stored in individual memory storage cores in what may be termed an interrupt multiplexing table, specifically 16 memory words of 16 storage cells each. There is one master interrupt bistable for each set of sixteen core interrupt cells for a total of 16 bistables.

When the central processor 10 acknowledges the DIPR interrupt present signal, the memory controller 18 extracts the word corresponding to the highest priority interrupt level bistable and determines the highest priority channel as indicated by the highest priority bit enabled within that word. The memory controller 18 (FIG. 2*b*) contains an interrupt vector address generator 95 which is comprised of the interrupt level binary encoder 97 and an interrupt cell binary encoder 110. The latter is a conventional binary encoding network which translates the sixteen output signals DZ 00–15 from the interrupt cell priority generator 94 (only one of which is enabled) into four signals XA 0–3. Output signals PA 0–3 from binary encoder 97 and output signals XA 0–3 from interrupt cell binary encoder 110 are transferred via lines 112 as signals VA 10–17 to an output data bus 114.

The command and control logic unit 46 is responsive to the data available pulse, $DA, to generate a signal CXAD which is transferred by line 116 to output data bus 114. The output data bus 114 is comprised of conventional logic switching elements and serves to transfer signals DM 00–17 representative of the interrupt vector address to the central processor 10 via bus 119. Input signals to the output data bus 114 are VA 10–17 from the interrupt vector address generator 95 and VA 0–9 from a vector base address generator 117 which generates fixed, predetermined signals representative of a reserved area 20 in core unit 15 for storage of interrupt vector words (FIG. 2*c*).

Figure 5:
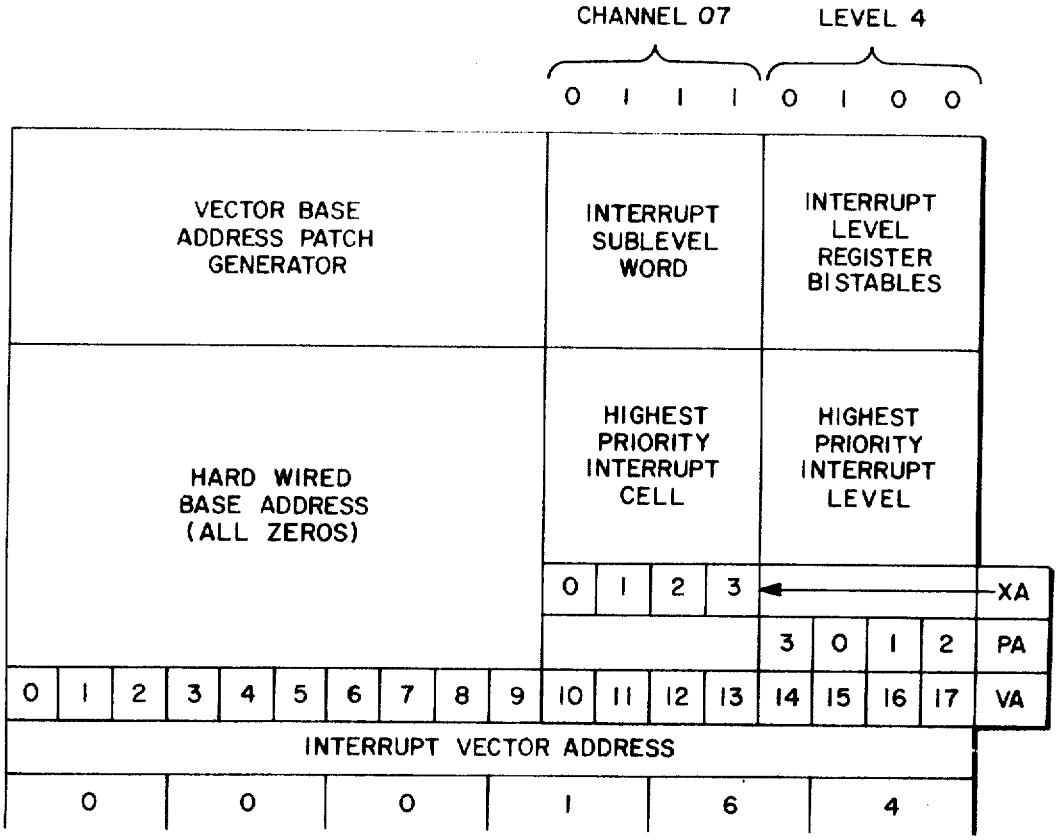
FIG. 5 is a diagram illustrating the format of an Interrupt Vector Word used in the practice of the present invention and the origin of the coded signals which form the parts thereof.

FIG. 5 shows the format and source of the various signals comprising the interrupt vector address. Referring now to FIG. 5, the interrupt vector address is formed by signals VA 00–17. The VA 0–9 signals represent a hard-wired base address which is generated by vector base address generator 117 (FIG. 2b). Signals VA 10–13 were originally the XA 0–3 signals from the interrupt cell binary encoder 110. They are representative of the highest priority interrupt cell in the interrupt sub-level word from the memory 14 (FIG. 2c). Signals VA 14–17 were originally the PA 0–3 signals from the interrupt level binary encoder 97 (FIG. 2b). The PA 0–3 signals represent the highest priority interrupt level bistable enabled in the interrupt level register 78, when the interrupt-present signal was acknowledged. For example, assume that input-output channel number 07 octal requested an interrupt of priority-level 4 and that that particular interrupt is of the highest priority. Interrupt level 4 would enable signal VA 15 and the channel number would enable signals VA 11, 12 and 13. The resulting interrupt vector address, with signals VA 11, 12, 13 and 15 enabled, would be 000164 octal.

Thus, the signals DM 00–17 which represent an interrupt vector address are transferred on bus 119 to the program execution unit 125 of the central processor 10 (FIG. 2d). Concurrently with the signal CXAD, the command and control logic unit 46 generates a pulse $MAVB which is transferred to the timing and control signal generator 128 of the central processor 10 via line 120. The $MAVB pulse serves to notify the central processor that the interrupt vector address signals are available to the program execution unit 125. The program execution unit 125 is responsive to (1) timing signals from the timing and control signal generator 128 (transferred via a bus 122), (2) logic signals (not shown) generated by the interrupt service unit 130 in response to the DIPR signal and transferred to the program execution unit 125 via bus 129, and (3) the interrupt vector address signals to effect a suspension of the program being executed, followed by starting another program or subroutine. The program execution unit 125 contains conventional hardware logic circuits well known in the art. These circuits generate a hard-wired transfer instruction TSY represented symbolically by block 124 within the program execution unit. The TSY instruction is generated in response to signals from the interrupt service unit 130, appropriately timed by signals from the timing and control signal generator 128. The transfer instruction 124 and the interrupt vector address (represented by block 123) serve to intervene the instruction of a program being executed (represented by block 126) and to function as the first instruction of a new program.

While the principles of the invention have now been made clear in an illustrative embodiment, there will be immediately obvious to those skilled in the art many modifications of structure, arrangement, proportions, the elements, material and components used in the practice of the invention, and otherwise, which are particularly adapted for specific environments and operating requirements without departing from those principles. The appended claims are, therefore, intended to cover and embrace any such modifications, within the limits only of the true spirit and scope of the invention.

What is claimed is:

1. In a data processing system having a working store, means for effecting an interruption of normal program execution in response to any one of a plurality of prescribed conditions within said system, said means comprising:

a plurality of bistables each normally in a first state and each capable of assuming a second state in response to an associated group of a plurality of interrupt signals, each of said bistables having a prescribed priority level with respect to each of the other of said bistables;

a plurality of segments of said working store, each of said segments corresponding individually with individual ones of said bistables on a one-to-one basis, each of said segments being divided into a plurality of parts, each of said parts having a relative priority level with respect to each of the other of said parts within the same segment, each of said parts normally in a first condition and capable of assuming a second condition in response to an associated one of said interrupt signals;

means within said system to generate said plurality of interrupt signals, each of said interrupt signals indicative of a need to interrupt normal program execution, each of said interrupt signals serving to change the bistable associated with said group to said second state and to change its associated part to said second condition;

means to select the bistable from those in said second state having the highest of said prescribed priority levels;

means responsive to said selecting means to generate a priority signal representative of the part having the highest of said relative priority levels in said segment corresponding with said highest priority bistable;

encoding means responsive to said priority signal and to said selecting means to generate a working store address; and means to utilize said address as a data source for directing the execution of said interruption.

2. In a data processing system having a memory, means for effecting an interruption of normal program execution in response to predetermined conditions within said system as represented by prescribed signals, said means comprising:

a plurality of bistable devices individually responsive to achieve an enabled state in response to a plurality of said prescribed signals, each of said bistable devices having a relative priority with respect to the remaining devices;

a plurality of segments of said memory equal in number to the number of said bistable devices, each of said segments associated with a different one of said bistable devices, each of said segments comprising a plurality of magnetic cores, each of said cores having assigned thereto a priority level with respect to each of the other cores within said segment, each one of said cores responsive to a different designated one of said prescribed signals to effect a change of state thereof from a first state serve to effect the change of state of said one core, said one designated signal further serving to enable the associated bistable device;

first means for selecting the bistable device in the enabled state having the highest relative priority;

second means for selecting from the segment associated with the selected bistable device, the core therein in said second state having the highest priority level; and means responsive to said first and said second selecting means to develop a memory address particular to said selected core, said memory address serving to provide a memory vector address to direct a deviation from normal program execution.

3. In a data processing system including a memory having addressable locations storing data and instructions therein, a processor for executing a program comprising a selected sequence of data manipulations in response to a corresponding sequence of instructions, an input/output multiplexer connected to a plurality of communicating devices for controlling the transfer of data to and from said communicating devices, at least one of said communicating devices including means for generating interrupt signals, a memory controller connected to said memory and connected also to said processor and to said input/output multiplexer for controlling access to said memory by said processor and by said input/output multiplexer and for controlling communication between said processor and said input/output multiplexer, the combination including means for effecting an interruption of normal program execution in response to predetermined conditions within said system as represented by said interrupt signals, said means comprising:

a plurality of bistable elements each responsive to at least one of said interrupt signals, each of said elements having a priority rating with respect to each of the other of said elements;

a plurality of segments of said memory equal in number to the number of said elements, each of said segments corresponding with a different one of said plurality of elements, each of said segments having a plurality of individual parts, each of said parts having a relative priority with respect to each of the other of said parts in said segment, each of said parts responsive to a different one of said interrupt signals to effect a change of state thereof from a first to a second state whereby a first one of said interrupt signals will act to enable one of said elements and a second one of said interrupt signals will act to change the state of one of said parts in the segment corresponding to said one of said elements;

a first means connected to said elements for recognizing one enabled element having the highest priority rating;

encoding means responsive to said first means for retrieving from said memory the segment corresponding to said one enabled element having the highest priority rating;

a second means for recognizing that part of said corresponding segment in said second state having the highest relative priority;

said encoding means further responsive to said first and second means to develop a memory address particular to said highest priority part, said memory address serving to provide a vector from said normal program execution to the execution of another program.

4. In a data processing system including a working store having addressable locations storing data and instructions therein, a processor for executing a program comprising a selected sequence of data manipulations in response to a corresponding sequence of instructions, an input/output multiplexer connected to a plurality of communicating devices for controlling the transfer of data to and from said communicating devices, said communicating devices including means for generating interrupt signals, a memory controller connected to said working store and connected also to said processor and to said input/output multiplexer for controlling access to said working store by said processor and by said input/output multiplexer and for controlling communication between said processor and said input/output multiplexer, the combination including means for providing interruptions to normal program execution through the recognition of specified conditions within the system as represented by said interrupt signals, said means comprising:

a plurality of bistable devices each responsive to any one of a plurality of said interrupt signals to store in said devices first indicia each representative of a class of interruption of said normal program execution, each of said bistable devices having a relative priority with respect to each of the other of said bistable devices;

a plurality of segments of said working store, each of said segments associated with one of said bistable devices on a one-to-one basis, each of said segments comprised of a plurality of bistable elements, each of said elements having a prescribed priority with respect to each of the other of the elements of that segment, each one of said elements responsive to a different one of said interrupt signals to store in said elements second indicia each representative of a predetermined one of said communicating devices;

means for generating first signals representative of the segment associated with the bistable device of highest relative priority having one of said first indicia stored therein;

means for generating second signals representative of the element of highest prescribed priority having one of said second indicia stored therein; and means responsive to said first and second signals for developing a working store address vector whereby the normal program execution may be interrupted to provide further program execution by said processor in accordance with the contents of said address vector.

5. In a data processing system including a central processor for performing a series of operations designated a program, a working store for retaining discrete information items at least a portion of which are instruction words for directing said program, a plurality of communicating devices in communication with said central processor and said working store, said communicating devices requiring diverse types of program services of said central processor upon generation of a request signal by said devices, interrupt means for effecting said program services on a priority basis by directing said central processor to a program sub-routine, said interrupt means comprising:

means in said communicating devices for generating interrupt signal groups concurrently with said request signal, said signal groups serving to identify said communicating devices and a type of program service required;

a plurality of segments of said working store, said segments equal in number to the number of said elements, each one of said segments associated with a different one of said elements and having the relative priority corresponding to said one associated element, each of said segments having a plurality of individual parts, each of said parts having a prescribed priority with respect to each of the other of said parts in said segment, said parts responsive to designated ones of said interrupt signal groups to effect a change of state thereof from a first to a second state whereby a designated interrupt signal group enables said one associated element of said first storage means and changes the state of one of said parts;

first selecting means connected to said storage means for selecting one enabled element having the highest relative priority;

address generating means responsive to said first selecting means for generating a working store address of the segment associated with said one enabled element having the highest relative priority;

second means for selecting one part of highest prescribed priority in said segment associated with said one enabled element having the highest relative priority;

said address generating means further responsive to said first and second selecting means for generating a vector address to said program sub-routine.

6. In a data communication system of the type having a central processor, a memory, and a plurality of diverse classes of communicating devices, each class having a priority of operation relative to each of the other of said diverse classes, means for initiating an interruption of normal program execution on a priority basis in response to any one of a plurality of prescribed conditions within said system, said means comprising:

means in more than one of said communicating devices for generating first and second signal sets, said first signal sets representative of any one of a plurality of different types of services to be performed during said interruption, said second signal sets each representative of the class and physical identity of a particular communicating device;

a first storage means for storing a plurality of first indicia each representative of one of said first signal sets, each of said first indicia having a predetermined relative priority corresponding to said type of service;

a second storage means for storing a plurality of second indicia each representative of one of said second signal sets, each of said second indicia having a predetermined priority rating relative to each of the other of said second indicia, said second storage means comprised of a number of segments of said memory, said number of segments equal at least to the number of said plurality of different types of services;

a third storage means in communication with said second storage means for temporarily storing one of said segments;

first selecting means for selecting a highest priority one of said first indicia from said first storage means;

first encoding means responsive to said selected first indicia for generating a first part of a two-part memory address;

means responsive to said first encoding means for transferring a segment corresponding to said selected first indicia to said third storage means;

second selecting means in communication with said third storage means for selecting a highest priority one of said second indicia from said corresponding selected segment;

second encoding means responsive to said second selecting means for generating a second part of said two-part memory address, said address corresponding to both a particular one of said communicating devices and to a particular function to be performed by it;

means for transferring said two-part memory address to said central processor; and means within said central processor for utilizing said address as a data source for directing the execution of said interruption.

* * * * *

UNITED STATES PATENT OFFICE
CERTIFICATE OF CORRECTION

Patent No. 3,665,415 Dated May 23, 1972

Inventor(s) Albert L. Beard and John C. Hunter

It is certified that error appears in the above-identified patent and that said Letters Patent are hereby corrected as shown below:

Claim 5, Col. 16, after line 7, insert
-- a storage means having a plurality of separately operable elements each capable of being enabled in response to at least one of said interrupt signal groups for storing a representation of said type of service required, each of said elements having a relative priority with respect to each of the other of said elements; --.

Claim 5, line 23, delete "first".

Signed and sealed this 9th day of January 1973.

(SEAL)
Attest:

EDWARD M.FLETCHER,JR.
Attesting Officer

ROBERT GOTTSCHALK
Commissioner of Patents